Nov. 24, 1970 R. L. OVERSTREET, JR 3,543,295

CIRCUITS FOR CHANGING PULSE TRAIN REPETITION RATES

Filed April 22, 1968 3 Sheets-Sheet 1

INVENTOR
R. L. OVERSTREET, JR.
BY H. L. Logan
ATTORNEY

CIRCUITS FOR CHANGING PULSE TRAIN REPETITION RATES

Filed April 22, 1968 3 Sheets-Sheet 2

CIRCUITS FOR CHANGING PULSE TRAIN REPETITION RATES

United States Patent Office 3,543,295

Patented Nov. 24, 1970

3,543,295

CIRCUITS FOR CHANGING PULSE TRAIN REPETITION RATES

Robert L. Overstreet, Jr., Burlington, N.C., assignor to Bell Telephone Laboratories, Incorporated, Murray Hill, N.J., a corporation of New York Filed Apr. 22, 1968, Ser. No. 723,083

Int. Cl. H03k 5/00

U.S. Cl. 328—38 5 Claims

ABSTRACT OF THE DISCLOSURE

A pulse-delay regenerative feedback loop is disclosed. A combination of AND and OR gates periodically blocks the loop to synchronize circulating pulses with a clock pulse train. Pulses obtained from the loop occur at repetition rates less than or greater than that of the clock pulse train.

GOVERNMENT CONTRACT

The invention claimed was made in the course of, or under contract with, the Department of the Army.

BACKGROUND OF THE INVENTION

Field of the invention

This invention relates to circuits for changing pulse train repetition rates.

Description of the prior art

One known circuit for changing pulse train repetition rates comprises a regenerative loop with built-in pulse delay circuitry. Each pulse of a pulse train is injected into the loop while previously injected pulses are eliminated by blocking the loop. As a result of these injecting and blocking actions, the loop output pulses have a repetition rate limited to a whole number multiple of the repetition rate of the input pulses. Such an output is, of course, unsatisfactory when repetition rate multiplication by fractions of less than one (i.e., dividing) or by improper factions is required.

SUMMARY OF THE INVENTION

An object of the invention is to produce output pulses having a repetition rate which is a multiple of the repetition rate of input pulses, where the multiple may comprise either a fraction, a whole number or an improper fraction.

This and other objects are achieved by a pulse-delay regenerative feedback loop in which circulating pulses occur only in response to a starting pulse and, furthermore, in which the circulating pulses are momentarily blocked in synchronism with a train of input pulses.

In accordance with the invention, the basic repetition rate of the circulating pulses is determined by the loop pulse delay and may be either greater or less than that of the input pulse train. In further accordance with the invention, the circulating pulses are periodically blocked for time periods less than their durations. This blocking action produces a momentary change in the repetition rate of the circulating pulses so that they are periodically synchronized with the input pulse train. The circulating pulses, which comprise output pulses, therefore have a repetition rate which is a multiple of the input pulse train rate.

Other objects and features of the invention will become apparent from a study of the following detailed description of a specific embodiment.

DESCRIPTION OF THE DISCLOSED EMBODIMENT

Figure 1:
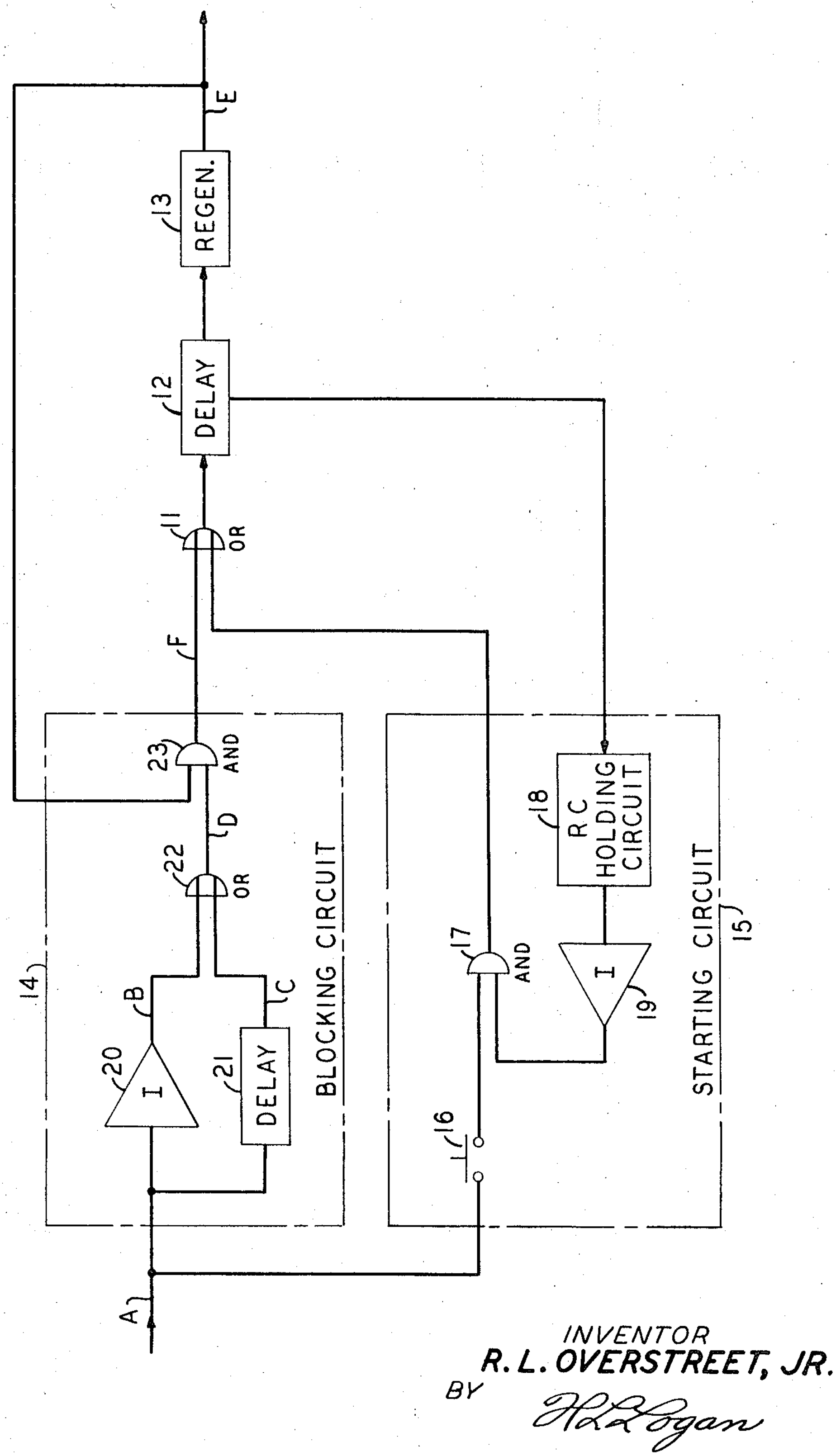
FIG. 1 is a block diagram of an embodiment of the invention.

The block diagram of FIG. 1 shows a pulse-delay regenerative feedback loop comprising, in series connection, an OR gate 11, a delay circuit 12, a pulse regenerator 13 and a blocking circuit 14. Circuit 14 blocks the loop in a period manner in response to pulses appearing on an input lead A. A starting circuit 15 is connected to OR gate 11 and is operable for injecting a pulse into the loop only when a circulating pulse is not present. Circuits 14 and 15 are now described in greater detail.

Starting circuit 15 comprises a pushbutton switch 16 which applies, when closed, positive pulses on input lead A to an AND gate 17. When the other input to AND gate 17 is positive, the first pulse is passed to OR gate 11. Subsequent pulses are then prevented from being applied to OR gate 11 by the following described action produced by an RC holding circuit 18 and an inverter 19.

RC holding circuit 18 and inverter 19 are connected in that order between delay circuit 12 and AND gate 17. When pulses are not circulating in the feedback loop, RC holding circuit 18 produces a substantially zero voltage output, which causes inverter 19 to apply a positive voltage to AND gate 17. Under these conditions, a positive pulse passed by pushbutton switch 16 is passed also by AND gate 17 to OR gate 11. This pulse now circulates in the loop. Each time it passes through delay circuit 12, it is applied to RC holding circuit 18. This circuit, when triggered, produces a positive output which causes inverter 19 to apply a zero voltage to AND gate 17. This positive output appears fast enough and is held long enough to prevent any further pulses passed by switch 16 from being injected into the loop. In other words, circuit 18 has a reltaively short charging time constant and a relatively long discharging time constant. One and only one pulse, therefore, can be injected into the loop.

Blocking circuit 14 comprises an inverter 20 and a delay circuit 21, each of which is connected to input lead A. A pair of leads B and C apply the outputs of inverter 20 and delay circuit 21, respectively, to an OR gate 22 whose output is applied by a lead D to an AND gate 23. AND gate 23 is connected in the feedback loop by way of a lead E to regenerator 13 and a lead F to OR gate 11. As will become apparent from the following discussion, the output from OR gate 22 is effective to block the feedback loop for short intervals immediately following the leading edges of the pulses on lead A.

The operation of the embodiment, once a pulse is circulating, may be better appreciated by considering FIGS.

2A through 2F which show the waveforms appearing on leads A through F, respectively. All of these waveforms have a common time base; that is, the various times $t$ indicated in FIG. 2F apply to all of them.

Figures 2A, 2B, 2C, 2D, 2E, 2F:
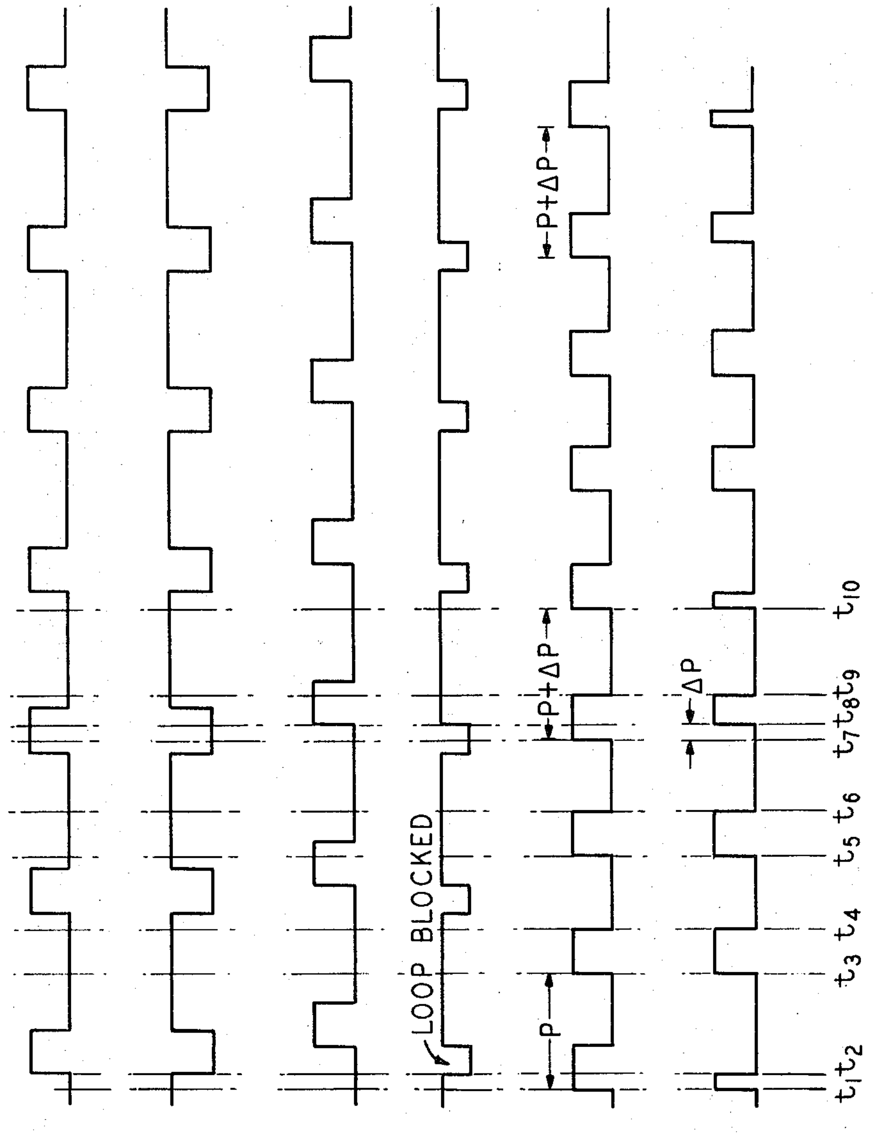
FIGS. 2A through 2F and 3A through 3F are waveforms oppearing at particular points within the embodiment of FIG. 1.

An input pulse train on lead A is inverted by inverter 20 as shown in FIGS. 2A and 2B. The input pulse train is also time delayed by delay circuit 12 for a period less than the durations of the pulse produced by regenerator 13. This is shown in FIG. 2C. The inverted and delayed pulses are applied to OR gate 22, which produces a positive voltage output wherever either one or both of its inputs are positive. As shown in FIG. 2D, the output of this OR gate is positive at all times with the exception of small time intervals immediately following the leading edges of the input pulses on lead A. These nonpositive intervals are effective to block the feedback loop and effect synchronization as follows.

At time $t_1$ a pulse on lead E (see FIG. 2E) is applied to AND gate 23 and is initially passed by the gate. The gate, however, becomes blocked at time $t_2$ (see FIG. 2D) so only a part of the pulse is passed as shown in FIG. 2F. This partial pulse is passed by OR gate 11, delayed by a period P in delay circuit 12 and applied to regenerator 13. The regenerator is triggered by the leading edge of the pulse and produces a fixed duration output pulse as shown between times $t_3$ and $t_4$ of FIG. 2E.

The output from OR gate 22 (FIG. 2D) is positive between times $t_3$ and $t_4$ so the pulse on lead E is passed to lead F as shown in FIG. 2F. The leading edge of this pulse causes regenerator 13 to produce another pulse between times $t_5$ and $t_6$ which is also passed to lead F. It should be noted that the blocking voltage on lead D between times $t_4$ and $t_5$ did not affect the circulating pulse.

The next pulse from regenerator 13 occurs between times $t_7$ and $t_9$. A blocking voltage appears, however, on lead D between times $t_7$ and $t_8$ so the pulse on lead E is blocked until time $t_8$. As a result, a shorted pulse appears on lead F between times $t_8$ and $t_9$; that is the leading edge of this pulse has been delayed by an interval $\Delta P$ with respect to the leading edge of the lead E pulse between times $t_7$ and $t_9$. Regenerator 13 is therefore triggered at time $t_{10}$ which is $P+\Delta P$ after its previous triggering. This delay of $\Delta P$ brings the circulating pulse back into synchronization with the pulse train on lead A. This complete cycle is then repeated as the circuit conditions at time $t_{10}$ correspond to those at time $t_1$. Every fourth output pulse is therefore delayed by an additional period of $\Delta P$.

In the above discussion, four output pulses (i.e., lead E pulses) are produced for each three pulses on lead A. The circuit therefore has a multiplying factor of 4/3. In the absence of the synchronizing feature of the invention, the delay period P provided by delay circuit 12 would have to equal ¾ that of the pulse train on lead A. The production of a delay circuit having this exact relationship is a physical impossibility. As demonstrated above, the present invention teaches the use of a delay circuit having slightly less delay and, furthermore, the use of the input or reference pulse train to synchronize by periodically retiming the circulating pulse.

Figure 3A:
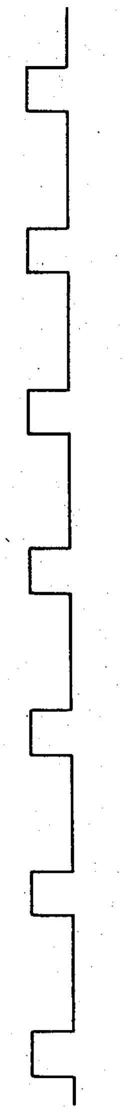
Figure 3B:
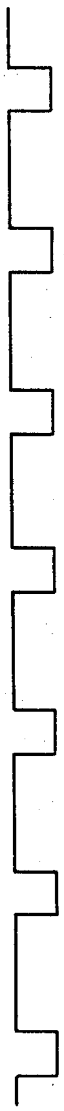
Figure 3C:
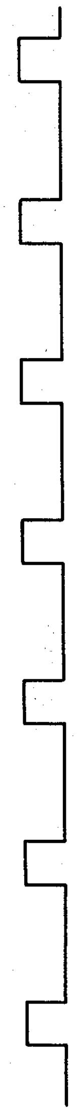
Figure 3D:
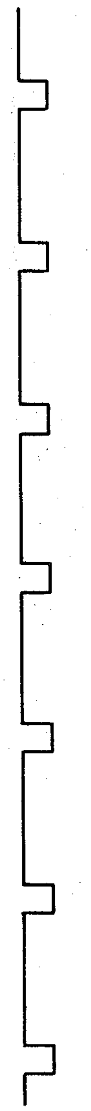
Figure 3E:
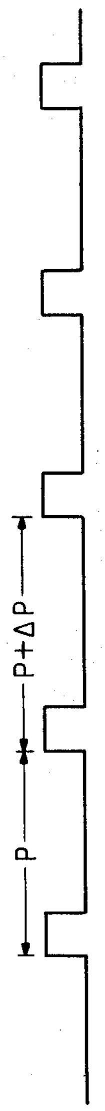
Figure 3F:
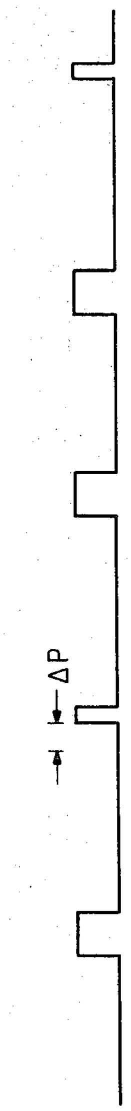

The embodiment of FIG. 1 may be used to multiply by fractions less than one. This may be appreciated by referring to the waveforms of FIGS. 3A through 3F, where those of FIGS. 3A through 3D correspond exactly to those of FIGS. 2A through 2D, respectively. In this use of the embodiment, the delay period P is slightly less than 4/3 times the period of the lead A pulse train. Furthermore, every third output pulse on lead E is delayed by an additional period of $\Delta P$. This is shown in FIGS. 3E and 3F which, as before, represent the waveforms on leads E and F, respectively. With this delay provided by delay circuit 12, the multiplying factor is 3/4. Various other multiplying factors may, of course, be produced by selecting appropriate delay times for circuit 12.

Although only one embodiment of the invention has been disclosed and described in detail, it is to be understood that various other embodiments may be devised by those skilled in the art without departing from the spirit and scope of the invention.

I claim:

1. In combination
a pulse-delay regenerative feedback loop,
means for producing a pulse in said loop only when a pulse is not circulating in said loop,
means to block periodically said loop for a time interval less than the duration of a pulse criculating in said loop, and
an output lead connected to said loop.

2. In combination
a feedback loop comprising, in series connection, blocking means and time-delay, pulse-regenerating means,
said blocking means responsive to each pulse in an input pulse train to block said loop for a time period less than the duration of pulses produced by said pulse regenerating means,
means for producing a pulse in said loop only when a pulse is not circulating therein, and
an output lead connected to said time-delay, pulse-regenerating means.

3. In combination
an input lead for receiving a train of input pulses,
a feedback loop comprising, in series connection, an OR gate, delay means, pulse regenerating means and a blocking circuit,
means connecting said blocking circuit to said input lead,
said blocking circuit being responsive to each pulse in said input pulse train to block said loop for a time period less than the duration of pulses produced by said regenerating means,
means connected between said input lead and said OR gate to produce a pulse in said loop only when a pulse is not circulating therein, and
an output lead connected to said loop to make available regenerated pulses as output pulses.

4. A combination in accordance with claim 3 in which said blocking circuit comprises
an inverter connected to said input lead,
delay means connected to said input lead and having a delay characteristic less than the pulse duration of the pulses produced by said regenerating circuit,
an OR gate having one input terminal connected to said inverter and a second input terminal connected to said delay means, and
an AND gate having one input terminal connected to said OR gate and, furthermore, a second input terminal and an output terminal as input and output terminals, respectively, connecting said blocking circuit in said loop.

5. In combination,
a first OR gate,
a delay circuit,
a pulse regenerator,
an AND gate,
means connecting said OR gate, said delay circuit, said regenerator and said AND gate in a closed series loop,
a second OR gate connected to apply its output to said AND gate,
an inverter,
a delay circuit having a delay time characteristic less than the duration of the pulses produced by the said regenerator,
means connected to apply outputs of said inverter and delay circuit to said second OR gate,
an input lead connected to said inverter and said delay means,
means connected to said first OR gate to produce a pulse in said loop only when a pulse is not circulating therein, and an output lead connected to said loop to make available pulses regenerated by said regenerator as output pulses.

References Cited

UNITED STATES PATENTS

| | | | |
|---|---|---|---|
| 2,482,974 | 9/1949 | Gordon | 328—38 X |
| 2,827,566 | 3/1958 | Lubkin | 307—208 |
| 2,892,934 | 6/1959 | Lubkin | 331—51 X |
| 2,942,192 | 6/1960 | Lewis | 328—164 X |

DONALD D. FORRER, Primary Examiner

S. D. MILLER, Assistant Examiner

U.S. Cl. X.R.

307—208, 233, 271; 328—39; 331—53